United States Patent Office 3,579,596
Patented May 18, 1971

3,579,596
HYDROGENOLYSIS OF CARBON TETRACHLORIDE AND CHLOROFORM
Charles R. Mullin and C. Elmer Wymore, Midland, Mich., assignors to The Dow Chemical Company, Midland, Mich.
No Drawing. Filed Mar. 29, 1968, Ser. No. 717,383
Int. Cl. C07c *17/06*
U.S. Cl. 260—658   12 Claims

ABSTRACT OF THE DISCLOSURE

A process for the selective vapor phase dechlorination of carbon tetrachloride and chloroform, resulting in lower chlorinated methanes, which comprises:

(A) Reacting carbon tetrachloride with an excess of hydrogen, at a temperature below 200° C. and a liquid hourly space velocity of 0.1 to 10, in the presence of a catalyst chosen from the metals Ru, Rh, Pd, Os, Ir, Pt, Cu, Ag, or Au, to produce predominantly chloroform; or (B) Reacting carbon tetrachloride with an excess of hydrogen, at a temperature of 125° to 350° C. and a liquid hourly space velocity of 0.5 to 10, in the presence of one of the catalysts of (A) above, to produce predominantly methylene chloride; or (C) Reacting chloroform with an excess of hydrogen, at a temperature of 75° to 350° C. and a liquid hourly space velocity of 0.1 to 10, in the presence of one of the catalysts of (A) above, to produce predominantly methylene chloride.

BACKGROUND OF THE INVENTION

A number of problems present themselves in the dechlorination of chlorinated methane compounds. For instance, if the thermal dechlorination of $CCl_4$ to $CHCl_3$ is carried out above 400° C., large quantities of tar are formed which clog the reactor.

The prior art teaches various methods of dehalogenating satuated and unsaturated halogenated hydrocarbons by catalytic hydrogenolysis. U.S. Pats. 2,651,664 and 2,658,929 (Ladd et al.) utilize an alkali medium to dimerize polychlorinated acyclic hydrocarbons by catalytically dechlorinating with hydrogen, while U.S. Pat. 2,427,791 (Ipatieff et al.) utilizes an alcohol medium to dehalogenate saturated hydrocarbons by catalytic hydrogenation. U.S. Pat. 2,886,605 (McClure et al.) exposes a chlorinated or brominated hydrocarbon to hydrogen at a high temperature (350°–500° C.) in the presence of a fluidized catalyst bed. And, U.S. Pat. 3,278,614 (Michel) teaches the dehalogenation of compounds of the formula $X(CH_2)_nCX_3$, wherein X is a halogen.

SUMMARY OF THE INVENTION

The instant invention is a process for the selective vapor phase declorination of a polychloromethane compound containing at least 3 chlorines, resulting, predominantly, in a chloromethane compound containing 2 or 3 chlorines. The process lends itself to being carried out in three aspects:

(A) The reaction of one mole of carbon tetrachloride with more than two moles of hydrogen, at a temperature of 0° to 200° C. and a liquid hourly space velocity of 0.1 to 10, in the presence of a catalyst chosen from the metals Ru, Rh, Pd, Os, Ir, Pt, Cu, Ag or Au, to produce predominantly chloroform; or (B) Reacting one mole of carbon tetrachloride with more than two moles of hydrogen, at a temperature of 125° to 350° C. and a liquid hourly space velocity of 0.5 to 10, in the presence of one of the catalysts of (A) above, to produce predominantly methylene chloride; or (C) Reacting one mole of chloroform with more than two moles of hydrogen, at a temperature of 75° to 350° C. and a liquid hourly space velocity of 0.1 to 10, in the presence of one of the catalysts of (A) above to produce predominantly methylene chloride.

The catalysts can either be used as such or supported by carriers such as alumina, carbon or silica.

The mole ratio of hydrogen to halogenated methane must be in excess of 2 to 1. If a lower mole ratio is used, undesirable polymerization reactions occur. A mole ratio of hydrogen/halogenated methane of 4/1 to 8/1 is preferable.

"Liquid hourly space velocity" is defined in the conventional manner, i.e., liquid pounds of feed/cubic foot of catalyst/hour. In the case of reactions (A) and (C) above, the liquid hourly space velocity can suitably vary from 0.1 to 10, and is preferably 0.5–2.0. In the case of reaction (B) above, the liquid hourly space velocity can vary from 0.5 to 10, and is preferably 1–3.

Pressure is not a critical variable in the process of this invention, and is preferably atmospheric or the autogenous pressure. The temperature of aspect (A) of this invention can vary from 0° C. to 200° C., and is preferably 80°–150° C. The temperature of aspect (B) of the process of this invention suitably varies from 125° to 350° C. and is preferably 175°–200° C. And, the temperature of aspect (C) of the process of this invention is preferably from 75° to 350° C., and preferably 200°–275° C.

SPECIFIC EMBODIMENTS

The following are specific examples of the present invention, but are in no way intended to limit same:

A three-foot tube furnace encasing a one-half inch (I.D.) by two-foot glass reactor was used, the reactor containing a thermowell. The catalyst, 0.5% platinum on alumina, either as ⅛ inch pellets or ground, was used in all cases. The catalyst bed was centered in the reactor. With this arrangement, temperature in the bed could be controlled to within ±2° C. up to 300° C.

Hydrogen was saturated with a halogenated methane in a conventional thermostated bubbler (at room temperature) and passed over the catalyst bed. Effluent was passed through a Dry Ice-methylene chloride trap and the noncondensibles bubbled through a caustic solution. Gas flow rates were measured with a calibrated rotometer, and liquid feed rates were obtained by weight loss of the bubbler. The liquid hourly space velocity in all cases was 1.0.

Products were identified by mass spectral analyses. The results are set out in Tables I–III:

TABLE I $[CCl_4 + H_2] \longrightarrow$ (30 cc. $H_2$/min., 2 cc. catalyst)]

| Temp. (°C.) | Mole, percent products | | | | Percent conversion |
|---|---|---|---|---|---|
| | $CHCl_3$ | $CH_2Cl_2$ | $CH_3Cl$ | $CH_4$ | |
| 70 | 97.7 | | | 2.3 | 62 |
| 95 | 96.6 | | | 3.4 | 75 |
| 135 | 92.1 | | | 7.9 | 95 |
| 140 | 90.0 | | | 10.0 | 93 |
| 180 | 89.8 | | | 15.2 | 100 |

TABLE II $[CHCl_3 + H_2] \longrightarrow$ (30 cc. $H_2$/min., 2 cc. catalyst)]

| Temp. (°C.) | Mole, percent products | | | | Percent conversion |
|---|---|---|---|---|---|
| | $CHCl_3$ | $CH_2Cl_2$ | $CH_3Cl$ | $CH_4$ | |
| 150 | | 66.0 | | 34.0 | 11 |
| 170 | | 65.2 | | 34.8 | 19 |
| 177 | | 60.3 | | 39.7 | 19 |
| 208 | | 43.2 | | 56.8 | 28 |
| 245 | | 34.0 | | 66.0 | 38 |
| 260 | | 29.0 | | 71.0 | 39 |
| 305 | | 14.0 | | 86.0 | 49 |

TABLE III

[CCl₄+H₂ → (75 cc. H₂/min., 4 cc. catalyst)]

| Temp., °C. | Weight, percent products | | | |
|---|---|---|---|---|
| | CCl₄ | CH₃Cl | CH₂Cl₂ | CH₄ |
| 155 | 86 | 12 | | 2 |
| 190 | | 59.2 | | 40.8 |
| 225 | | | 40 | 60 |

We claim:

1. A process for the selective vapor phase dechlorination of a polychloromethane compound containing at least 3 chlorine atoms, resulting predominantly in a chloromethane compound containing 2 or 3 chlorine atoms, which comprises reacting one mole of said polychloromethane compound with more than two moles of hydrogen, at a temperature of 0° to 350° C. and a liquid hourly space velocity of 0.1 to 10.0, in the presence of a metal selected from the group consisting of Ru, Rh, Pd, Os, Ir, Pt, Cu, Ag and Au as a catalyst.

2. The process of claim 1 wherein CCl₄ is dechlorinated to CHCl₃ at a temperature of 0° to 200° C.

3. The process of claim 1 wherein CCl₄ is dechlorinated to CH₂Cl₂ at a temperature 125° to 350° C. and a liquid hourly space velocity of 0.5 to 10.0.

4. The process of claim 1 wherein CHCl₃ is dechlorinated to CH₂Cl₂ at a temperature of 75° to 350° C.

5. The process of claim 1 wherein the mole ratio of hydrogen to the chloromethane starting material is 4/1–8/1.

6. The process of claim 2 wherein the liquid hourly space velocity is .5–2.0.

7. The process of claim 2 wherein the temperature is 80°–150° C.

8. The process of claim 3 wherein the liquid hourly space velocity is 1–3.

9. The process of claim 3 wherein the temperature is 175°–200° C.

10. The process of claim 4 wherein the liquid hourly space velocity is .5–2.0.

11. The process of claim 4 wherein the temperature is 200°–275° C.

12. The process of claim 1 wherein the temperature is from 70° to 350° C.

References Cited

UNITED STATES PATENTS

| | | | |
|---|---|---|---|
| 2,886,605 | 5/1959 | McClure et al. | 260—650 |
| 3,278,614 | 10/1966 | Michel | 260—658 |

LEON ZITVER, Primary Examiner

J. A. BOSKA, Assistant Examiner